United States Patent [19]

Rhee et al.

[11] 3,947,631
[45] Mar. 30, 1976

[54] AUTOMATIC VIDEO SIGNAL CONTROL CIRCUIT

[75] Inventors: Dong Woo Rhee, Williamsville; Joseph Edward Thomas, Batavia, both of N.Y.

[73] Assignee: GTE Sylvania Incorporated, Stamford, Conn.

[22] Filed: Feb. 27, 1974

[21] Appl. No.: 446,396

[52] U.S. Cl. .................... 178/7.3 R; 178/7.3 DC
[51] Int. Cl.² ........................................ H04N 5/16
[58] Field of Search ........ 178/7.3 R, 7.3 DC, 7.5 R, 178/7.5 DC

[56] References Cited
UNITED STATES PATENTS

| | | | |
|---|---|---|---|
| 3,514,533 | 5/1970 | Weger | 178/7.3 DC |
| 3,760,099 | 9/1973 | Kong | 178/7.3 R |

*Primary Examiner*—Robert L. Griffin
*Assistant Examiner*—Aristotelis M. Psitos
*Attorney, Agent, or Firm*—Norman J. O'Malley; Thomas H. Buffton; Cyril A. Krenzer

[57] ABSTRACT

An automatic video signal control circuit for a television receiver includes apparatus for generating horizontal and vertical pulse signals to effect cancellation of the horizontal and vertical blanking pulse signals in a received television signal and for providing a video signal having a black level derived from the peak black level in the video portion of the received signal and a white level derived from the combined average and peak white level in the video portion of the received signal.

23 Claims, 4 Drawing Figures

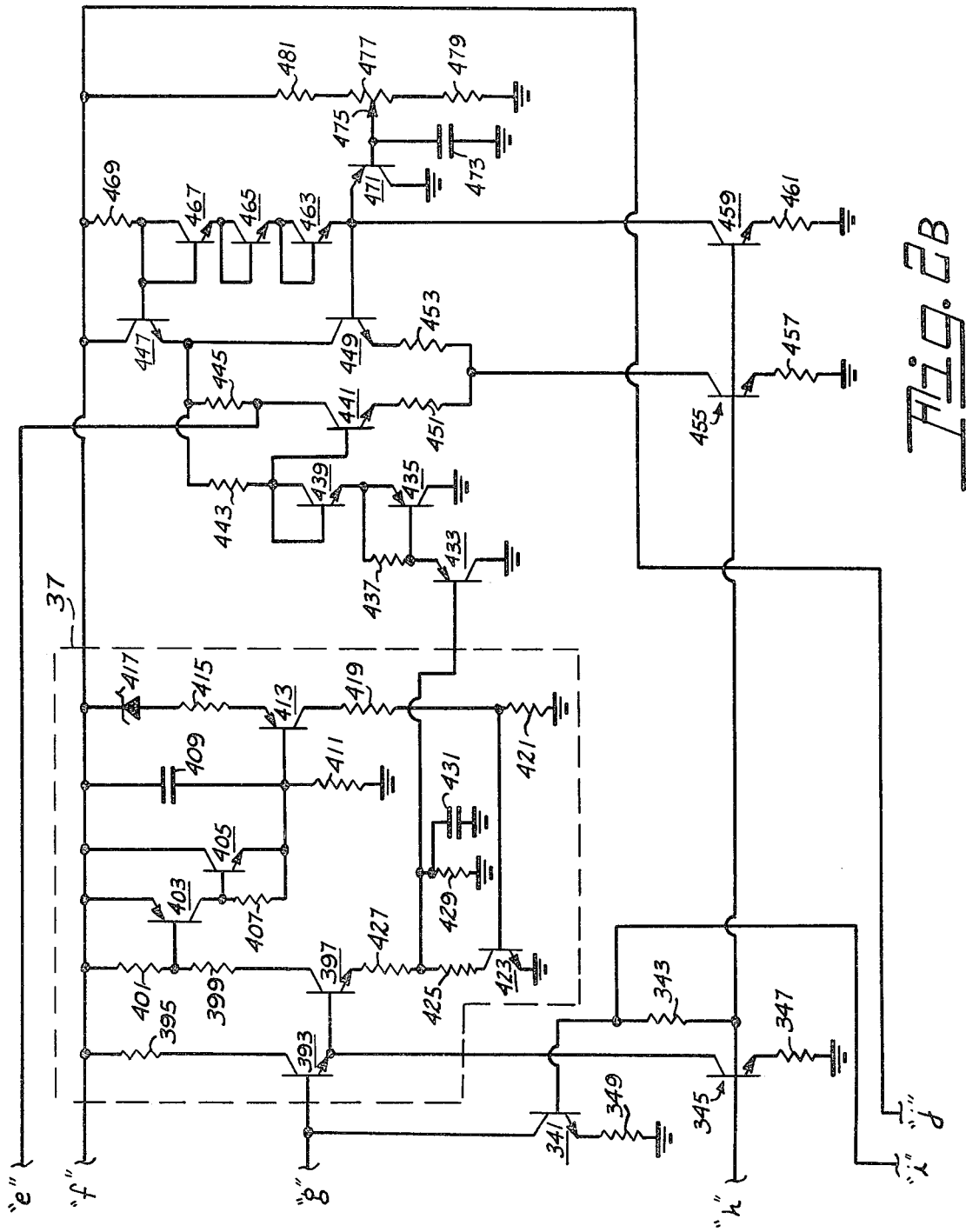

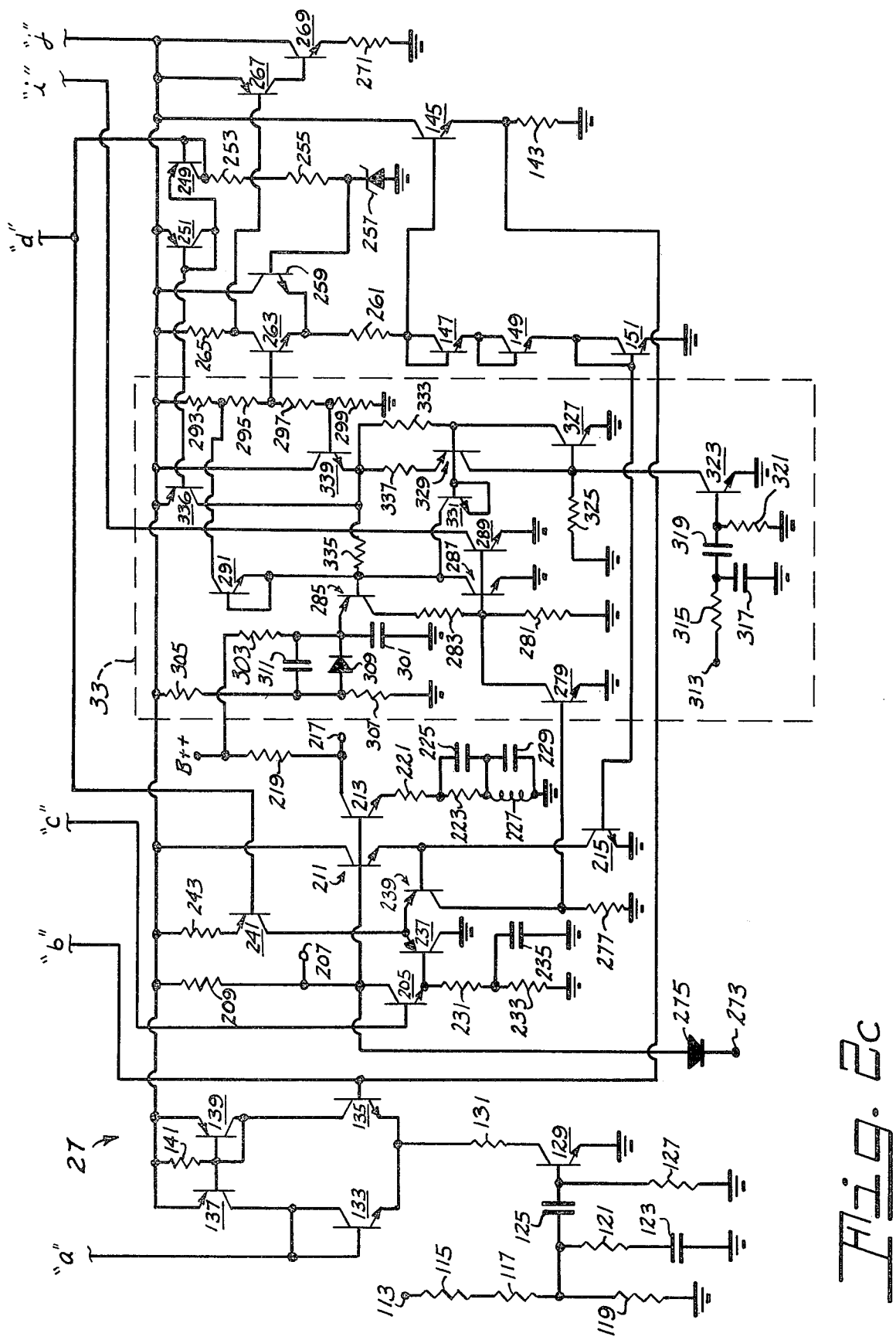

AUTOMATIC VIDEO SIGNAL CONTROL CIRCUIT

CROSS-REFERENCE TO OTHER APPLICATIONS

A concurrently filed application entitled "Pulse Width Control and Advancing Circuit" bearing Attorney's Docket number D-7763 U.S. Ser. No. 446,496 and filed in the name of an inventor of the present application relates to a technique for internal development of pulse signals having increased width and advanced with respect to a received signal. Also, a concurrently filed application entitled "Peak Detector Sample and Hold Circuit" bearing Attorney's Docket number D-7730 U.S. Ser. No. 446,397 and filed in the name of an inventor of the present application relates to circuitry for detecting peak black and white video signal levels.

BACKGROUND OF THE INVENTION

Generally, the television receiver art utilizes a plurality of coupling techniques for applying a detected video signal to a display device such as a cathode ray tube. For example, AC coupling, DC coupling, AC and DC coupling combinations, and back porch clamping of the video pulse signals are a few of the more common approaches for applying the detected video signal to the display device.

Unfortunately, AC coupling is responsive to the average signal level without regard to the peak black and white signal levels. Thus, the black level varies from grey to blacker than black in accordance with the black content of the video signal while the white level is similarly uncontrolled.

Also, DC coupling tends to provide fairly good peak white levels and peak black level signals for a display so long as the black, white, and sync tip levels of the transmitted signal are properly proportioned and properly transmitted at a correct level. However, it has been found that the above-mentioned proportions and levels tend to undesirably vary from station to station and program to program.

The AC-DC combination can provide some improvement over either one of the single coupling techniques but, unfortunately, includes the above-mentioned disadvantages of both to a greater or lesser degree. Moreover, the back porch clamping of the video signal would be an ideal system so long as the transmitted black and white levels were perfect. Unfortunately, the transmitted black and white levels vary from station to station as mentioned above.

OBJECTS AND SUMMARY OF THE INVENTION

An object of the present invention is to provide a television receiver having an enhanced video signal handling capability. Another object of the invention is to provide improved video signal coupling apparatus for signal receiver. Still another object of the invention is to provide an improved automatic video signal control circuit for a television receiver. A further object of the invention is to provide apparatus for utilizing the peak black level and a combination of the average and peak white levels of the video portion of a received signal in an image display device. A still further object of the invention is to effect cancellation of the horizontal and vertical blanking pulse signal within a received signal and to utilize the peak black level and the combined average and peak white levels of the video portion of the received signal to energize a display device.

These, and other and further objects, advantages and capabilities are achieved in one aspect of the invention by an automatic video signal control circuit wherein cancellation of the blanking pulse signals of a received television signal is effected and the peak black level along with the combined peak and average white levels of the video portion of the received signal are employed to provide the black and white levels viewed on a display device.

BRIEF DESCRIPTION OF THE DRAWINGS

FIGS. 2A, 2B, and 2C are a schematic illustration of an automatic video signal control circuit suitable to the television receiver of FIG. 1.

DESCRIPTION OF THE PREFERRED EMBODIMENT

For a better understanding of the present invention, together with other and further objects, advantages and capabilities thereof, reference is made to the following disclosure and appended claims in conjunction with the accompanying drawings.

Figure 1:
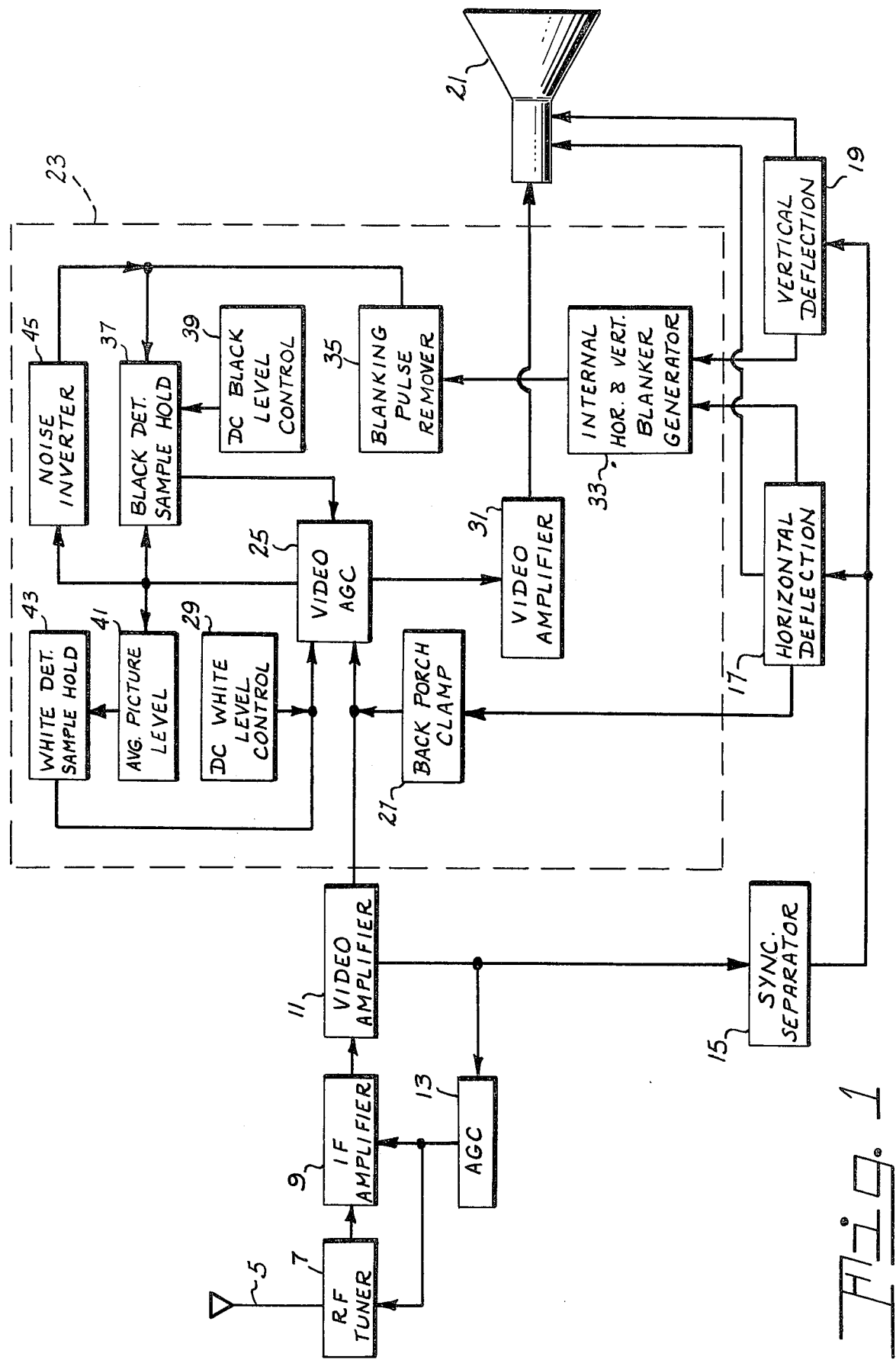
FIG. 1 is a block diagram of a television receiver employing a preferred embodiment of the invention.

Referring to the block diagram of FIG. 1, a television receiver includes the usual antenna 5 for receiving a transmitted television signal. The antenna 5 is coupled to an RF tuner stage 7 which is, in turn, coupled to an IF amplifier stage 9 and then to a video detector and amplifier stage 11.

The video detector and amplifier stage 11 provides an output signal which is applied to an automatic gain control (AGC) network 13 having an output coupled back to the RF tuner stage 7 and IF amplifier stage 9. The output from the video detector and amplifier stage 11 is also applied to a sync pulse separation stage 15 wherein synchronizing pulse signal at horizontal and vertical frequencies are separated and applied to horizontal and vertical deflection stages, 17 and 19, respectively. The horizontal and vertical deflection stages, 17 and 19, each provide horizontal and vertical scan output signals which are applied to a display device or cathode ray tube 21 and to an automatic video signal control circuit 23.

The automatic video signal control circuit 23 includes a video signal automatic gain control (AGC) network 25 which is coupled to the video detector and amplifier stage 11. A back porch clamping circuit 27 is coupled to the video signal AGC network 25 and to the horizontal deflection stage 17 of the signal receiver. Also, an adjustable DC white level potential control 29 is coupled to the video signal AGC network 25. Moreover, the output of the video signal AGC network 25 is applied to a video amplifier stage 31 which is coupled to the cathode ray tube 21.

The automatic video signal control circuit 23 also includes an internal horizontal and vertical blanking signal generator 33 which is coupled to the horizontal and vertical deflection stages, 17 and 19, and by way of a blanking signal removal stage 35 to a black peak detector sample and hold circuit 37. The black peak detector sample and hold circuit 37 is coupled back to the video signal AGC network 25 and to an adjustable DC black level potential control 39.

The video signal AGC network 25 is connected and also coupled by way of an average picture level (APL) network 41 to a white peak detector sample and hold circuit 43. Moreover, a noise inverter stage 45 is coupled to the video signal AGC network 25 and to the output of the blanking signal removal stage 35.

As to operation, it may be generally stated that a received signal which includes a video portion as well as horizontal and vertical blanking portions is applied to the automatic video signal control circuit 23. Therein, an internal horizontal and vertical pulse signal generator 33 provides horizontal and vertical pulse signals of a width greater than the width of the horizontal and vertical blanking pulse portions of the received signal whereupon cancellation thereof is effected.

Also, a black peak detector sample and hold circuit 37 provides a peak black level in accordance with the black contained within the scene or video portion of the received signal. Similarly, a white peak detector sample and hold circuit 43 provides a peak white level in accordance with the content of the video portion of the received signal. This peak white level signal is modified in accordance with the average picture level of the scene as determined by the APL network 41.

Thus, the automatic video signal control circuit 23 internally generates horizontal and vertical pulse signals which cancel the horizontal and vertical blanking pulse portions of a received signal. Also, the peak black level of the video information is utilized to provide the black level for a display device. Further, the peak white level of the video information and the average picture level of the video information are combined to provide the white level for the display device. Moreover, manual adjustments on black and white preference controls are provided for individual viewer selection of the desired black and white levels as seen on the display device.

Figure 2A:
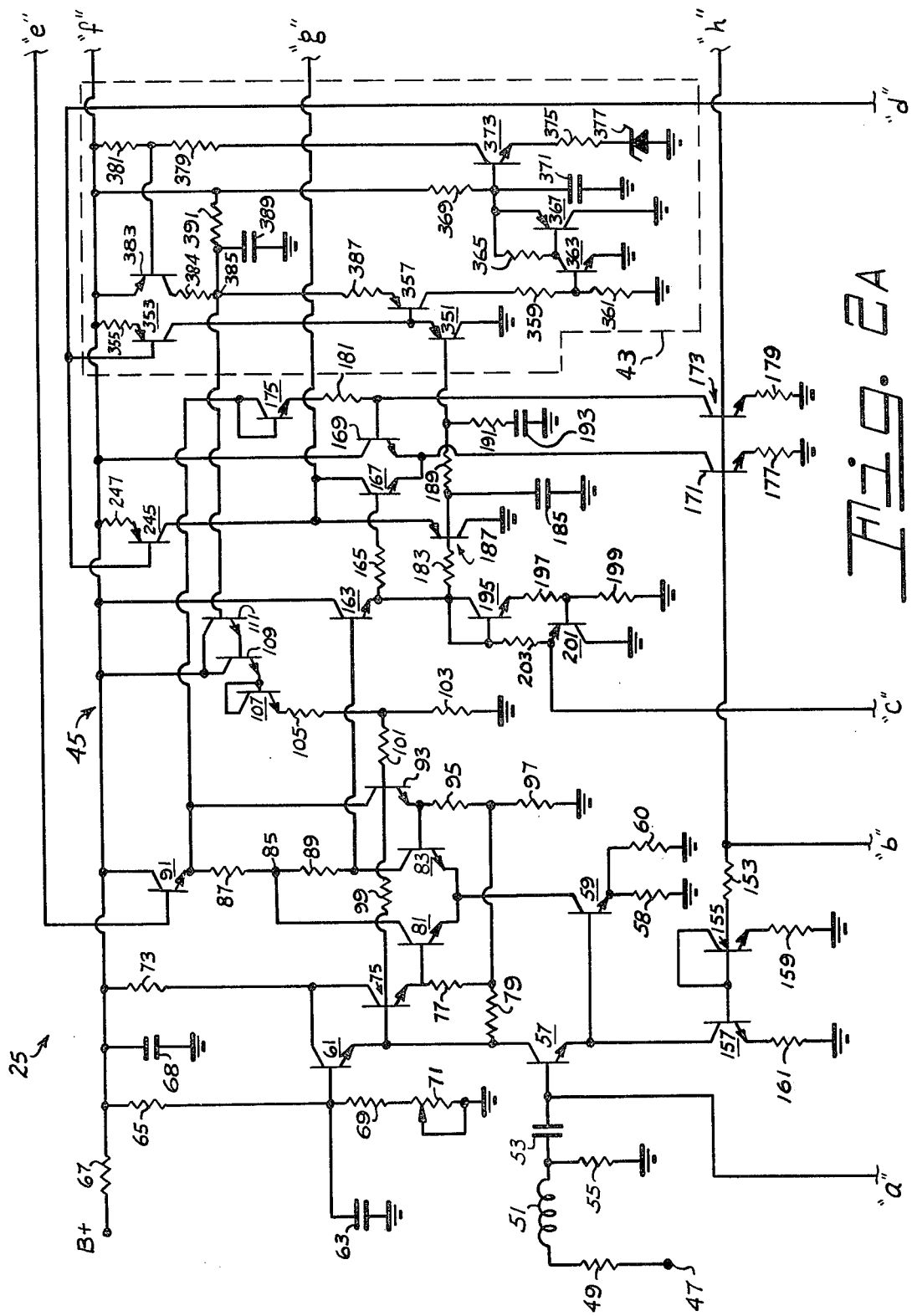

More specifically, FIG. 2 illustrates a preferred embodiment of the automatic video signal control circuit 23 of FIG. 1. Herein, a video signal available at an input terminal 47 is coupled by a series connected resistor 49 and delay line 51 to to a charge storage capacitor 53 with a resistor 55 coupling the delay line 51 and capacitor 53 to ground.

The charge storage capacitor 53 is coupled to the base of a transistor 57 included in an automatic video signal control circuit such as 25 of FIG. 1. This transistor 57 has an emitter coupled to the base of a second transistor 59 having an emitter connected by resistors 58 and 60 to circuit ground. The collector of the transistor 57 is coupled to the emitter of a transistor 61. The base of the transistor 61 is coupled by a capacitor 63 to circuit ground, by series connected resistors, 64 and 67, to a potential source B+, by a capacitor 68 to ground, and by a series connected fixed resistor 69 and adjustable resistor or adjustable white level potential control 71 to circuit ground.

The collector of transistor 61 is connected by a resistor 73 to the potential source B+ and to the collector of a transistor 75 having a base coupled to the emitter of the transistor 61 and the collector of the transistor 57. The emitter of the transistor 75 is coupled by series connected resistors 77 and 79 to the collector of the transistor 57 and and the emitter of the transistor 61. The transistor 75 emitter is also coupled to the base of a transistor 81.

The transistor 81 in conjunction with a transistor 83 are part of a comparator circuit with interconnected emitters connected to the collector of the transistor 59. The collector of the transistor 81 is coupled to the junction 85 of a pair of series connected resistors 87 and 89. The resistor 87 is coupled to the emitter of a transistor 91 having a collector connected to the potential source B+. The resistor 89 is connected to the collector of the transistor 83.

The base of the transistor 83 is connected to the emitter of a transistor 93, by series connected resistors 95 and 97 to circuit ground with the junction of the series connected resistors 95 and 97 connected to the junction of the series connected resistors 77 and 79. The base of the transistor 93 is connected by a resistor 99 to the base of the transistor 75 and by a resistor 101 to the junction of resistor 103 connected to circuit ground and resistor 105 connected to the emitter of a transistor 107.

The base of the transistor 107 is connected to the emitter and to the emitter of a transistor 109. The base of the transistor 109 is connected to the emitter of a transistor 111 with the collectors of the transistors 109 and 111 connected to the potential source B+. The base of the transistor 111 is coupled to a white level peak detector and hold circuit 43 of FIG. 1.

Referring back to the automatic video signal control circuit 25 and particularly the base of the transistor 57, a back porch clamping circuit, 27 of FIG. 1, is coupled thereto. An input terminal 113 has a flyback pulse signal input, such as the output of the horizontal deflection circuit 17 of FIG. 1, coupled to resistors 115, 117, and 119 series connected to circuit ground. The junction of series connected resistors 117 and 119 is coupled to a resistor 121 connected by a capacitor 123 to circuit ground and to a capacitor 125 connected to circuit ground by a resistor 127 and to the base of a transistor 129.

The emitter of the transistor 129 is connected to ground and the collector is coupled by a resistor 131 to the emitters of a pair of transistors, 133 and 135. The base of transistor 133 is connected to the base of the transistor 57 of the video signal control circuit 25. The base of the transistor 133 is also connected to the collector which is connected to the collector of a transistor 137. The base of the transistor 137 is connected to the base and collector of a transistor 139 and by a resistor 141 to the potential source B+. The emitters of the transistors 137 and 139 are connected to the potential source B+ and the collector of the transistor 139 is connected to the collector of the transistor 135.

The base of transistor 135 is connected to the junction of a resistor 143 connected to ground and the emitter of a transistor 145. The transistor 145 has a collector connected to the potential source B+ and a base coupled to circuit ground by way of series coupled diode-connected transistors, 147, 149 and 151. The base of transistor 135 is also connected to a resistor 153 coupled to the bases of a diode-connected transistor 155 and transistor 157. The emitter of the diode-connected transistor 155 is coupled by a resistor 159 to circuit ground while transistor 157 has a resistor 161 coupling the emitter to ground. The collector of transistor 157 is connected to the junction of the emitter of transistor 57 and base of transistor 59.

The output of the automatic video signal control circuit 25 available at the junction of the collector of the transistor 83 and resistor 89 is applied to the base of a transistor 163. The collector of the transistor 163 is connected to the potential source B+ and the emitter provides an output which is coupled by a resistor 165 to the base of a transistor 167.

Transistors 167, 169, 171, 173, and 175 form an impulse noise elimination network, 45 of FIG. 1. The collector of transistor 167 is coupled to a black level peak detector sample and hold means, 37 of FIG. 1, which will be explained hereinafter. The emitters of the transistors 167 and 169 are connected to the collector of the transistor 171 which has an emitter connected to ground by a resistor 177 and a base connected to the resistor 153 and base of transistor 135 and to the base of transistor 173. Transistor 173 has an emitter coupled by a resistor 179 to circuit ground and a collector coupled to the base of the transistor 169. A series-coupled resistor 181 and diode-connected transistor 175 couple the base of the transistor 169 to an output of the automatic video signal control circuit 25 at the junction of the resistor 87 and transistor 91.

Another output of the automatic video signal control circuit 25 available at the emitter of the transistor 163 is coupled by way of a filter and delay network which includes a resistor 183 connected to ground by a capacitor 185 and to the base of a transistor 187. The collector of the transistor 187 is connected to ground while the emitter is connected to the collector of the transistor 167 of the noise eliminator network 45 and to the black level peak detector sample and hold means 37 as will be explained hereinafter.

The output of the filter and delay network available at the junction of the resistor 183, capacitor 185, and base of transistor 187 is also applied to an average picture level (APL) network. This APL network includes a resistor 189 coupled to the junction of the resistor 183 and capacitor 185 of the filter and delay network and to a resistor 191 connected to ground by a capacitor 193. The junction of the resistors 189 and 191 of the APL network is coupled to the white level peak detector sample and hold means 43 in a manner to be explained hereinafter.

Still another output of the automatic video signal control circuit 25 available at the emitter of transistor 163 is applied to the collector of and base of a transistor 195. The emitter of the transistor 195 is connected to ground by a voltage divider which includes series connected resistors 197 and 199. The junction of the series connected resistors 197 and 199 is connected to the base of a transistor 201. the collector of transistor 201 is connected to ground while the emitter is connected by a resistor 203 to the base and collector of transistor 195 and directly connected to the base of a transistor 205 having a video signal amplifier capability.

The collector of the transistor 205 is connected to an output terminal 207 and by a resistor 209 to the potential source B+. The collector of the transistor 205 is also coupled to the base of a transistor 211 and the base of a transistor 213. The collector of the transistor 211 is connected to the potential source B+ while the emitter is connected to the collector of a transistor 215. The transistor 215 has a grounded emitter and a base connected to the base and collector of the diode-connected transistor 151. The transistor 213 has a collector connected to an output terminal 217 and by a resistor 219 connected to a potential source B++. The emitter of the transistor 213 is connected to a resistor 221 which is connected to a parallel coupled resistor 223 and capacitor 225. A parallel coupled inductor 227 and capacitor 229 couple the resistor 223 and capacitor 225 to ground.

The emitter of the transistor 205 is connected to a resistor 231 coupled to ground by a parallel connected resistor 233 and capacitor 235. The emitter of the transistor 205 is also connected to the base of a transistor 237 having a grounded collector and an emitter connected to the emitter of a transistor 239. The emitters of the transistors 237 and 239 are connected to the collector of a transistor 241 having an emitter coupled by a resistor 243 to the potential source B+. The base of the transistor 241 is connected to the base of a transistor 245 having an emitter connected by a resistor 247 to the potential source B+ and a collector connected to the collectors of the transistor 167 and emitter of the transistor 187.

The base of the transistor 241 is also coupled to the base and collector of a transistor 249. The emitter of the transistor 249 is connected to the collector and base of a transistor 251 having an emitter connected to the potential source B+ and base connected to an internal horizontal and vertical pulse signal generating means, 33 of FIG. 1, as will be explained hereinafter.

The base and collector of the transistor 249 are connected to circuit ground by series connected resistors 253 and 255 and a zener diode 257. The junction of the resistor 255 and zener diode 257 is connected to the base of a transistor 259 having a collector connected to the potential source B+. The emitter of the transistor 259 is connected to the junction of the transistor 145 and 147 by a resistor 261 and to the emitter of a transistor 263 having a base coupled to the internal horizontal and vertical pulse signal generating means 33. The collector of the transistor 263 is connected to the potential source B+ by a resistor 265. The collector of the transistor 263 is also connected to the base of a transistor 267 having an emitter connected to the potential source B+ and a collector connected to the base of a transistor 269. The collector of the transitor 269 is connected to the potential source B+ while the emitter is connected by a resistor 271 to ground.

Referring to the internal horizontal and vertical pulse signal generating means 33, which is detailed in a concurrently filed application entitled "Pulse Width Control and Advancing Circuit" bearing U.S. Ser. No. 446,496, a flyback pulse signal available from the horizontal deflection circuitry, 17 of FIG. 1, is applied to an input terminal 273. A diode 275 couples the flyback pulse signal to the collector of the transistor 205 and via the transistors 205 and 237 to the transistor 239.

The collector of the transistor 239 is connected to ground by a resistor 277 and to the base of a transistor 279 having a grounded emitter. The collector of the transistor 279 is connected to a resistor 281 coupled to circuit ground, a resistor 283 coupled to the collector of a transistor 285, and the base of transistors 287 and 289. Transistor 287 and 289 have grounded emitters and the collector of transistor 287 is coupled to the base of the transistor 285, resistor 335, and by a diode-connected transistor 291 to the junction of a voltage divider including series connected resistors 293, 295, 297, and 299 intermediate a potential source B+ and ground.

The emitter of the transistor 285 is connected to ground by a capacitor 301 and to a potential source B++ by a resistor 303. Also, series connected resistors 305 and 307 intermediate the potential source B+ and reference potential have a junction coupled by a parallel connected diode 309 and capacitor 311 to the emitter of the transistor 285.

A vertical scan input signal, available from the vertical deflection circuitry, 19 of FIG. 1, appears at an input terminal 313. This vertical input signal is coupled by a resistor 315 to a capacitor 317 connected to ground and by a capacitor 319 to a resistor 321 connected to ground and to the base of a transistor 323. The transistor 323 has a grounded emitter and a collector coupled to ground by a resistor 325, to the base of a transistor 327, and to the collector of a transistor 329.

The base of the transistor 329 is coupled by a diode-connected transistor 331 to the collector of the transistor 287 and by series connected resistors 333 and 335 to the base of the transistor 285. The emitter of the transistor 329 is connected by a resistor 337 to the junction of the series connected resistors 333 and 335 and to the emitter of a transistor 339. Also, a transistor 336 connects the junction of the resistors 333 and 335 to the potential source B+ with a base connected to the transistor 251. The transistor 339 has a base connected to the junction of the series connected resistors 297 and 299 and a collector connected to the potential source B+.

The transistor 289 has a grounded emitter and a collector providing an output signal which is applied to the base of a transistor 341 forming a blanking pulse signal removal circuit, 35 of FIG. 1. The base of the transistor 341 is connected by a resistor 343 to the base of a transistor 345 having an emitter connected to ground by a resistor 347 and a collector coupled to the black level peak detector sample and hold circuit 37. Moreover, the emitter of the transistor 341 is coupled to ground by a resistor 349 while the collector is connected to the black level peak detector sample and hold circuit 37 and to the collector of the transistor 167 of the noise inverter circuit, 45 of FIG. 1.

The white and black level peak detector sample and hold circuits, 43 and 37 respectively, are fully discussed in the co-pending application filed concurrently herewith bearing U.S. Ser. No. 446,397 and entitled "Peak Detector Sample and Hold Circuit". The white level peak detector sample and hold circuit 43 includes a transistor 351 having a grounded emitter with a base coupled to the junction of resistors 189 and 191 which are a part of the previously-mentioned average picture level (APL) network, 41 of FIG. 1. The collector of the transistor 351 is grounded and the emitter is coupled to the collector of a transistor 353 having an emitter coupled by a resistor 355 to the potential source B+ and a base coupled to the base of the base of transistor 245, the base of transistor 241, and the base and collector of the transistor 249.

The emitter of the transistor 351 is also connected to the base of a transistor 357 having a collector coupled by series connected resistors 359 and 361 to circuit ground. The junction of the series connected resistors 359 and 361 is connected to the base of a transistor 363 having a grounded emitter. The collector of the transistor 363 is connected to the base and by a resistor 365 to the emitter of a transistor 367 having a grounded collector. The emitter of the transistor 367 is connected to the junction of a resistor 369 coupled to the potential source B+, a capacitor 371 connected to ground, and the base of a transistor 373.

The transistor 373 has an emitter connected to ground by a series connected resistor 375 and zener diode 377. The collector of the transistor 373 is coupled to the potential source B+ by series connected resistors 379 and 381. The junction of the series connected resistors 379 and 381 is coupled to the base of a transistor 383 having an emitter coupled to the potential source B+ and a collector coupled by a resistor 384 to a junction 385. The junction 385 is connected by a resistor 387 to the emitter of the transistor 357, to a capacitor 389 connected to ground, to a resistor 391 connected to the resistor 369 and potential source B+, and to the base of the transistor 111, which is coupled via transistor 109, transistor 107, and transistor 93 to transistor 83 of a comparator circuit in the video signal AGC means, 25 of FIG. 1.

Also, the black level peak detector sample and hold circuit 37 includes a transistor 393 having a base connected to the collector of the transistor 341 of the blanking pulse signal removal circuit, 35 of FIG. 1, to the collector of the transistor 167 of the noise inverter circuit, 45 of FIG. 1, and via the emitter of transistor 187 and resistor 183 to the emitter of the transistor 163 of the video signal AGC circuit, 25 of FIG. 1. The collector of the transistor 393 is connected to the potential source B+ by a resistor 395 while the emitter of the transistor 393 is connected to the collector of the transistor 345 and to the base of a transistor 397.

The transistor 397 has a collector coupled by series connected resistors 399 and 401 to the potential source B+ with the junction of the series connected resistors 399 and 401 connected to the base of a transistor 403. The transistor 403 has an emitter connected to the potential source B+ and a collector connected to the base of a transistor 405 and via a resistor 407 to the emitter. The emitter of the transistor 405 is connected to the junction of a capacitor 409 coupled to the potential source B+, a resistor 411 connected to ground, and the base of a transistor 413.

The transistor 413 has an emitter connected to the potential source B+ by a series connected resistor 415 and zener diode 417. The collector of the transistor 413 is connected to ground by series connected resistors 419 and 421. The junction of the series connected resistors 419 and 421 is coupled to the base of a transistor 423 having a grounded emitter. The collector of the transistor 423 is coupled by series connected resistors 425 and 427 to the emitter of the transistor 397. The junction of the series connected resistors 425 and 427 is coupled to a parallel-connected resistor 429 and capacitor 431 connected to ground and to the base of a transistor 433.

The transistor 433 receives a signal at the base thereof and has a grounded collector and an emitter coupled to the base of a transistor 435 and via a resistor 437 to the emitter. The collector of the transistor 435 is grounded and the emitter is connected to the emitter of a diode-connected transistor 439. The base and collector of the transistor 439 are connected to the base of a transistor 441 which is included in a comparator network circuit. The base and collector of the transistor 439 are also connected by a resistor 443 to a resistor 445 connected to the collector of the transistor 441 and to the emitter of a transistor 447 and collector of a transistor 449.

The emitter of the transistors 441 and 449 are connected by resistors, 451 and 453, to the collector of a transistor 455 having an emitter connected to ground by a resistor 457 and a base connected to the base of the transistor 345 and to the base of a transistor 459. Transistor 459 has an emitter connected to ground by a resistor 461 and a collector connected to the base of the transistor 449 and to the potential source B+ via series connected transistors, 463, 465 and 467 and resistor 469.

Also, the collector of the transistor 459 and the base of the transistor 449 are connected to the emitter of a transistor 471. The collector of the transistor 471 is grounded and the base is connected to a capacitor 473 coupled to ground and to the alterable arm 475 of an adjustable resistor 477 which is the DC black level control adjustment. The resistor 477 is connected to ground by a resistor 479 and to the potential source B+ by a resistor 481.

Further, the collector of the transistor 441 is coupled back to the base of the transistor 91. Thus, a comparator network, including transistors 441 and 449, receives potentials from the black level peak detector sample and hold circuit 37 of FIG. 1 and from the DC black level adjustable control 39 of FIG. 1. Moreover, the resultant comparison signal is applied to the video signal AGC circuit, 25 of FIG. 1, via the transistor 91.

As to operation, a video input signal with a negative going sync. signal is applied to the video signal input terminal 47 and coupled via a delay line 51 to a charge storage capacitor 53. This charge storage capacitor 53 is coupled by way of amplifiers in the form of transistors 57 and 59 to a comparator means in the video signal AGC circuit 25. Also, the charge storage capacitor 53 is coupled to the base and collector of a transistor 133 employed in a bi-directional back porch clamping circuit 27.

The bi-directional back porch clamping circuit 27 receives a flyback pulse signal at an input terminal 113. This input signal is integrated to provide a sawtooth-shaped signal which is combined with the flyback pulse signal and applied to the base of a transistor 129. In this manner, conductivity of the transistor 129 is effected only during the back porch period of the applied video signal.

Also, a comparator network includes transistors 133 and 135. A bias of about two diode-drops or twice the base to emitter voltage of a transistor is applied to the base of the transistor 135 by way of the bias network including transistors 145, 147, 149, and 151. The bias at the base of the transistor 133 is maintained at the two base to emitter voltage value by the charged capacitor 53.

However, an increase in the charge of the capacitor 53 will raise the base voltage of the transistor 133 turning transistor 133 on. Thereupon, transistor 135 will be turned off as will transistors 137 and 139. Thus, the charge capacitor 53 will discharge by way of transistors 133 and 129. Oppositely, a decreased charge on the capacitor 53 will turn off transistor 133 and turn on transistor 135. Thereupon, the capacitor 53 will charge to the desired two base to emitter ($2V_{be}$) potential level via transistors 129, 135, 139, and 137. Thus, the potential available at the input to the storage capacitor 53 is clamped at a given back porch level and this clamped back porch level signal is applied via transistors 57 and 59 to the video signal AGC means 25. Moreover, undesired deviations from the clamped back porch level, such as sync pulse signals for example, are eliminated by transistors 57 and 59.

This video signal having a back porch clamped at a $2V_{be}$ level is applied via the amplifier transistors 57 and 59 to the emitters of the transistors 81 and 83 of a comparator circuit. The comparator circuit, transistors 81 and 83, pass the signal therethrough in accordance with the DC level at the bases thereof.

Assuming the DC level at the base of transistor 81 is higher than the DC level at the base of transistor 83, signal current will flow through the transistor 81 and resistor 87 developing a relatively low potential across the resistor 87 which is applied via the resistor 89 to the base of the transistor 163. If the DC level at the base of transistor 83 is higher than the DC level at the base of transistor 81, signal current will flow through the transistor 83 and resistors 89 and 87 developing a rather high potential across both resistors 89 and 87 which will be applied to the transistor 163. Thus, any differential change between the DC potentials at the base of the transistors 81 and 83 causes a change in the signal strength developed across the resistors 87 and the combination of resistors 87 and 89 whereby is determined the signal strength applied to the transistor 163.

The DC potential applied to the base of the transistor 81 is derived from an adjustable white level control, resistor 71, and applied via transistors 61 and 75 to the base of transistor 81. The DC potential at the base of the transistor 83 is a variable DC potential representative of the white level of the video signal available at a junction 385 of the peak white detection sample and hold circuit 43. This variable DC potential is applied to the base of the transistor 83 via transistors 111, 109, 107, and 93. Thus, circuitry for automatically controlling video signal gain in response to DC potential variation at a manual control 71 and a junction 385 of a peak white level sample and hold circuit 43 has been provided.

As to the DC potential available at the junction 385, an output available at the emitter of the transistor 163 is coupled by way of a filter and delay circuit to an average picture level (APL) circuit. The filter and delay circuit includes the resistor 183 and capacitor 185 whereby the video signal and particularly the horizontal blanking portion of the applied video signal is delayed. Moreover, the filter tends to eliminate very rapid and short-lived sudden charges in the video signal portion of the received signal whereby a viewer is not subjected to sudden flashes in a viewed scene.

The average picture level (APL) circuit includes resistors 189 and 191 as well as the capacitor 193. The video signal available from the filter and delay circuit is averaged out or integrated by the resistors 189 and 191 and the capacitor 193. Thus, potential at the junction of the resistor 191 and capacitor 193 is a DC voltage representative of the average picture level or average brightness level of the applied video signal.

It should be noted that the average picture level (APL) circuitry is unique in that the system does not rely on arbitrary or preset threshold levels. Rather, the average level varies as picture content varies and the APL compensation is a function of the transmitted signal solely.

Further, the video signal available at the output of the filter and delay circuit, resistor 183, is applied via resistor 189 to the base of a transistor 351. Thus, the average and peak white level signals are applied to the transistor 351 which is a part of the white level peak detection sample and hold circuit 37.

The peak white signal is detected by the transistors 351 and 357 and stored by the capacitor 389. If the average picture content or APL potential available at the junction of resistors 189 and 191 is greater than normal implying a high brightness picture scene, the DC potential at the charge capacitor 389 and at the junction 385 will be lower than normal. This lower than normal DC potential at the junction 385 will be eventually applied to the transistor 83 decreasing the signal developed across the resistors 87 and 89 which, in turn, effects a reduction in the peak video signal appearing at the junction of the resistors 189 and 191. Thus, the video signal appearing at the emitter of the transistor 163 is automatically maintained at a given brightness level.

Also, the white peak detector sample and hold circuit 37 is detailed in a co-pending application bearing U.S. Ser. No. 446,397. Briefly, a video signal with positive going sync. signal is applied to transistor 351 and coupled via transistor 357 to the charge capacitor 389 whereat a potential representative of the peak and average white signal level is attained and applied back to the video signal AGC circuit 25. At the same time, collector current flows through the transistor 357 turning on transistors 363 and 367 whereby capacitor 371 is discharged. In turn, discharge of capacitor 371 turns off transistor 373 which turns off transistor 383.

Should the peak input signal level decrease, the charge capacitor 389 would normally charge at a relatively slow rate via the resistor 391. However, the rapid rate of charge is effected due to decrease current in the transistor 351 and 357 which turns off transistors 363 and 367 whereupon capacitor 371 will charge turning on transistor 373. Conduction of transistor 373 will result in conduction of transistor 383 and a rapid charge path for the charge capacitor 389.

Thus, the APL network and the white peak level detector sample and hold circuit 43 provide a combined average white level and peak white level derived from the video portion of a received signal. This combined average and peak white level is fed to a video signal AGC circuit 25 wherein an average brightness signal level is automatically maintained. Moreover, this automatic brightness level is selectively determinable by adjustment in accordance with a viewer's desires.

Referring back to the output of the video AGC circuit 25, the output available at the emitter of the transistor 163 is coupled by way of the filter and delay circuit, resistor 183 and capacitor 185, and a transistor 187 to the base of a transistor 393 of the black peak level detector sample and hold circuit 37. This black peak level detector sample and hold circuit 37 is similar in operation to the white peak level detector sample and hold circuit 43 described above and fully detailed in a co-pending application bearing U.S. Ser. No. 446,397.

Briefly, the circuitry detects the peak black level of the video signal and applies a DC potential representative of this peak black level to a comparator circuit which includes transistors 441 and 449. Also, an adjustable black level control in the form of adjustable resistor 477 provides a DC potential to a transistor 449 in the comparator circuit. A resultant differential signal is fed back via the base of a transistor 91 to the video signal AGC circuit 25 whereby a relatively constant black level is automatically maintained.

Also, the above-mentioned output from the video signal AGC circuit 25 is applied to a noise inverter circuit 45. This noise inverter circuit 45 includes transistors 167 and 169 having a base potential of transistor 169 slightly lower than the peak porch level of the video signal due to a voltage drop through a resistor 181 and transistor 175. Whenever a video signal appearing at the emitter of the transistor 163 and applied to the base of the transistor 167 is above the base potential applied to the transistor 169, transistor 167 will be rendered constructive lowering the emitter voltage of the transistor 187 and preventing the noise signals from reaching the transistor 393 of the black peak level detector sample and hold circuit 37.

Further, the output signal from the video AGC circuit 25 available at the emitter of the transistor 163 is applied via transistor 195, voltage divider resistors 197 and 199, and transistor 201 to the video amplifier circuit in the form of transistor 205. In turn, transistor 205 is coupled to the base of a transistor 213 having a video system output terminal 217.

Additionally, an internal horizontal and vertical blanker pulse generator circuit 33 develops signals for effecting cancellation of the horizontal and vertical blanking portions of a received video signal. This circuitry is explained and fully detailed in a co-pending application entitled "Pulse Width Control and Advancing Circuitry" bearing U.S. Ser. No. 446,496 and filed concurrently with the present application.

Briefly, a flyback pulse signal available from the horizontal deflection circuitry, 17 of FIG. 1, is applied to a terminal 273. This signal is coupled via a diode 275 to collector of transistor 205. The collector of transistor 205 is higher than the emitter of transistor 205 in normal operation. Thus, the base of transistor 237 is lower than the base of transistor 239 and transistor 239 is turned off. When the flyback pulse signal is coupled to the collector of transistor 205, the collector of transistor 205 is lowered and approaches the emitter voltage of transistor 205, resulting in combination of transistor 239. The conduction of transistor 239 turns on transistor 279 and transistor 279 in conjunction with transistors 287 and 285 form a first trigger network. Moreover, this first trigger network is coupled to a first charge storage network including the potential source B+, series connected resistors 305 and 307, diode 309, and capacitor 301.

Also, a vertical scan signal available from the vertical scan deflection circuitry, 19 of FIG. 1, is applied to an input terminal 313 and coupled via a transistor 323 to a second trigger network. The second trigger network includes transistors 327 and 329 and is coupled to the transistors 285 and 287 of the first trigger network, via resistor 335 and transistor 331.

A second charge storage network includes a resistor 303 coupled to a potential source B++, a capacitor 311 connected to the junction of the resistors 305 and 307, and a capacitor 301 connected to circuit ground and to the transistor 285. Moreover, the base of the transistor 287 is coupled to the base of a transistor 289 having an output at the collector thereof.

Briefly stated, the first trigger circuit has a given threshold level and in response to a horizontal flyback pulse signal at the input terminal 273 provides an output pulse signal at the horizontal frequency scan rate with a width greater than the width of the input horizontal flyback pulse signal due to the first charge storage network. The second trigger circuit network receives a retrace signal at the vertical scan rate at an input terminal 313. This vertical retrace signal is coupled to a clamping network including the transistor 323 whereby an output signal advanced with respect to the applied signal is provided. This advanced output signal is applied to the second trigger circuit whereby the threshold level of the first trigger circuit is shifted and the second charge storage network is employed. Thus, an output signal for effecting blanking during vertical retrace is both advanced and widened with respect to the retrace signal applied to the vertical input terminal 313.

Also, the internal horizontal and vertical blanker generator circuit 33 utilized a clamping network in conjunction with first and second trigger circuits and first and second charge storage networks to provide an output pulse signal advanced with respect to the vertical retrace portion of a received signal. Moreover, the developed pulse signal has a width greater than the width of the vertical blanking portion of the received signal.

Additionally, the internally developed pulse signals having a width greater than the horizontal blanking pulse signals and of a width greater than and advanced with respect to the vertical retrace pulse portions of a received signal are applied by way of a blanking signal removed stage, 35 of FIG. 1, to the black peak detector sample and hold circuitry, 37 of FIG. 1. The developed pulse signals available at the collector of the transistor 289 are coupled to the base of a transistor 341. In turn, transistor 341 provides an output signal at the collector which is coupled to the base of transistor 393 of the black peak detector sample and hold circuit 37.

In operation, an internally developed pulse signal available at the collector of the transistor 289 is applied to the base of the transistor 341 rendering transistor 341 conductive. Conduction of transistor 341 lowers the emitter potential of the transistor 187. Thus, no signal can be peak detected by the black peak detector sample and hold circuit 37 during the horizontal and vertical blanking periods. Consequently, the darkest scene of the video portion of a received signal provides the black level of the viewable picture regardless of the variations in sync pulse signals or blanking pulse levels.

Thus, there has been provided a unique automatic video signal control circuit. The circuit has numerous advantages over any other known systems for controlling a video signal. The circuitry utilizes the darkest portion of a received signal to provide the black level and a combination of average and peak white levels in the video signal to establish brightness of a viewed scene.

Also, the undesired variations in the blanking level normally encountered in known transmitted and received signals are eliminated insofar as the viewer is concerned. A unique pulse advancing and pulse widening technique is utilized such that the viewed scene is independent of received blanking pulse signals. Moreover, signals representative of the average picture level (APL) or brightness of a scene are developed without benefit of pre-determined threshold levels.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a signal receiver providing a source of video signals, a source of flyback pulse signals, and a source of vertical deflection signals in response to transmitted television signals containing video signals and horizontal and vertical blanking signals, an automatic video signal control circuit comprising:

means coupled to said source of video signals for automatically controlling the gain of said video signal;

means coupled to said source of flyback pulse signals and said source of vertical deflection signals for developing pulse signals having a width greater than the width of said horizontal and vertical blanking signals;

means coupled to said means for developing pulse signals having a width greater than the width of said horizontal and vertical blanking signals for effecting cancellation of said horizontal and vertical blanking signals;

means coupled to said means for automatically controlling the gain of said video signal and said means for effecting cancellation of said horizontal and vertical blanking signals for peak detecting the black level of said video signal;

means coupled to said means for automatically controlling the gain of said video signal for effecting an average white level from said video signal;

means coupled to said means for automatically controlling the gain of said video signal for effecting a peak white level from said video signal whereby white and black levels for a display device are derived from the darkest scene of a picture and from a combined average and peak brightness scene of a picture.

2. The automatic video signal control circuit of claim 1 wherein is included means coupled to said source of video signals for clamping the back porch of the horizontal blanking signal at a fixed level.

3. The automatic video signal control circuit of claim 1 including an adjustable white level DC control means coupled to said means for automatically controlling the gain of said video signal.

4. The automatic video signal control circuit of claim 1 including an adjustable black level DC control means coupled to said means for peak detecting the black level of said video signal.

5. The automatic video signal control circuit of claim 1 including a signal filter and delay network coupling said means for automatically controlling the gain of said video signal to said means for effecting an average white level from said video signal.

6. The automatic video signal control circuit of claim 1 including a signal filter and delay network coupled to said means for automatically controlling the gain of said video signal and signal clamping means coupling said means for developing pulse signals having a width greater than the width of said horizontal and vertical blanking signals to said flyback pulse signal source for advancing said generated horizontal and vertical pulse signals with respect to the received horizontal and vertical blanking signals.

7. In a television receiver having vertical blanking and flyback pulse signal sources, a video signal source providing video signals which include blanking pulse signals having a back porch portion, and adjustable DC black and white level potential controls, an automatic video signal control circuit comprising:

back porch clamping means coupled to said flyback pulse signal source;

video signal AGC means coupled to said video signal source, said back porch clamping means, and to said adjustable DC white level potential control, said video signal AGC means providing a video output signal;

internal horizontal and vertical blanking signal generating means coupled to said vertical blanking and flyback pulse signal sources for developing horizontal and vertical blanking signals;

black level peak detector sample and hold means coupled to said video signal AGC means, said internal horizontal and vertical blanking signal generating means, and to said adjustable DC black level potential control;

average picture level (APL) compensation circuit means connected to said video signal AGC means; and white level peak detector sample and hold means coupled to said video signal AGC means and to said average picture level (APL) compensation circuit whereby horizontal and vertical blanking pulse signals in a received television signal are cancelled and a combined average and peak white level and a peak black level of the received video signal determine the black and white levels of a display device.

8. The automatic video signal control circuit of claim 7 including noise inverter means coupled to said video signal AGC means and to said black level peak detector sample and hold means whereby noise signals of a magnitude greater than said blanking pulse signals in said video signal are cancelled.

9. The automatic video signal control circuit of claim 7 including video signal amplifier means coupled to said video signal AGC means and providing a video output signal.

10. The automatic video signal control circuit of claim 7 wherein said back porch clamping means includes signal integrating means coupled to said flyback pulse signal source.

11. The automatic video signal control circuit of claim 7 wherein said video signal AGC means includes a comparator means coupled to said adjustable DC white level potential control and to said white level peak detector sample and hold means whereby the white level of a signal available from said video signal AGC means is determined by a comparison of said adjustable DC white level potential and the peak white level modified by the average white level of the video signal applied to said video signal AGC means.

12. The automatic video signal control circuit of claim 7 wherein said average picture level (APL) compensation circuit is in the form of an integrating network.

13. The automatic video signal control circuit of claim 7 including a filter and signal delay network coupling said average picture level (APL) compensation circuit to said video signal AGC means.

14. The automatic video signal control circuit of claim 7 including a blanking pulse signal removal circuit coupling said inernal horizontal and vertical blanking signal generating means to said black level peak detector sample and hold means whereby generated blanking signals are employed to effect removal of blanking signals from a received video signal.

15. The automatic video signal control circuit of claim 7 wherein is included a comparator means coupled to said adjustable DC black level potential control and to said black level peak detector sample and hold means for providing a resultant differential signal potential representative of the difference between the potential provided by the adjustable DC black level potential and the black level of the video portion of a received television signal.

16. The automatic video signal control circuit of claim 7 wherein said internal horizontal and vertical blanking signal generating means includes time constant circuit means for developing horizontal and vertical blanking signals of a width greater than the width of horizontal and vertical blanking signals in a received television signal.

17. An automatic video signal control circuit for a television receiver having vertical blanking and flyback pulse signal sources, a video signal source with video signals having blanking pulse signals with a back porch portion, an adjustable black signal level potential control, and an adjustable white signal level potential control comprising:

means coupled to said flyback pulse signal source for back porch clamping a video signal having blanking pulse signals;

means for automatically controlling the gain of a video signal coupled to said video signal source, said means for back porch clamping a video signal, and said adjustable white signal level potential control;

means for providing an average picture level potential coupled to said means for automatically controlling the gain of a video signal;

means for peak detecting sampling and holding the peak white level of a video signal coupled to said means for providing an average picture level (APL) potential and to said means for automatically controlling the gain of a video signal;

means for internally generating horizontal and vertical blanking signals coupled to said vertical blanking and flyback pulse signal sources; and means for peak detecting sampling and holding the black level of a video signal coupled to said means for internally generating horizontal and vertical blanking signals, said means for automatically controlling the gain of a video signal, and said ajustable DC black level potential control whereby the black and white levels of a display device are determined by the peak black level and combined peak and average white levels of the video portion of a received television signal.

18. The automatic video signal control circuit of claim 17 including means for filtering and delaying a received signal coupling said means for automatically controlling the gain of a video signal to said means for providing an average picture level (APL) potential.

19. The automatic video signal control circuit of claim 17 including means for cancelling noise signals coupled to said means for automatically controlling the gain of a video signal and to the junction of said means for internally generating horizontal and vertical blanking signals and said means for peak detecting sample and holding the black level of a video signal.

20. The automatic video signal control circuit of claim 17 including a blanking pulse signal removal circuit coupling said means for internally generating horizontal and vertical blanking signals and said means for peak detecting sampling and holding the black level of a video signal.

21. The automatic video signal control circuit of claim 17 wherein said means for back porch clamping a video signal includes a means for integrating a signal coupled to said flyback pulse signal source.

22. The automatic video signal control circuit of claim 17 wherein said circuitry is in integrated circuit form.

23. The automatic video signal control circuit of claim 17 wherein said means for back porch clamping is a bi-directional clamping network.

* * * * *

UNITED STATES PATENT OFFICE
CERTIFICATE OF CORRECTION

PATENT NO. : 3,947,631
DATED : March 30, 1976
INVENTOR(S) : Dong Woo Rhee and Joseph Edward Thomas It is certified that error appears in the above-identified patent and that said Letters Patent are hereby corrected as shown below:

Column 9, line 33 - Please insert "input" after pulse

Column 12, line 31 - Please delete "combination" and insert -- conduction --.

Column 15, line 53 - Please delete "inernal" and insert -- internal --.

Signed and Sealed this

Thirteenth Day of July 1976

[SEAL]

Attest:

RUTH C. MASON
Attesting Officer

C. MARSHALL DANN
Commissioner of Patents and Trademarks